Sept. 1, 1964 W. TALBOT 3,146,624
ACCELEROMETER
Filed March 20, 1961
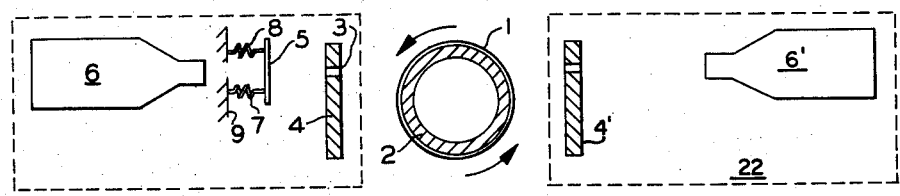
FIG. 1
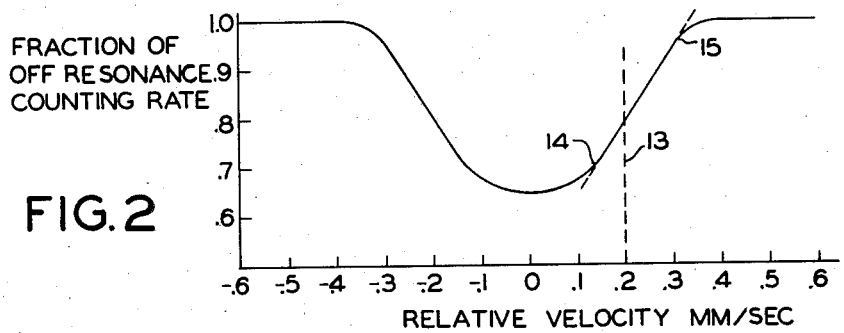
FIG. 2
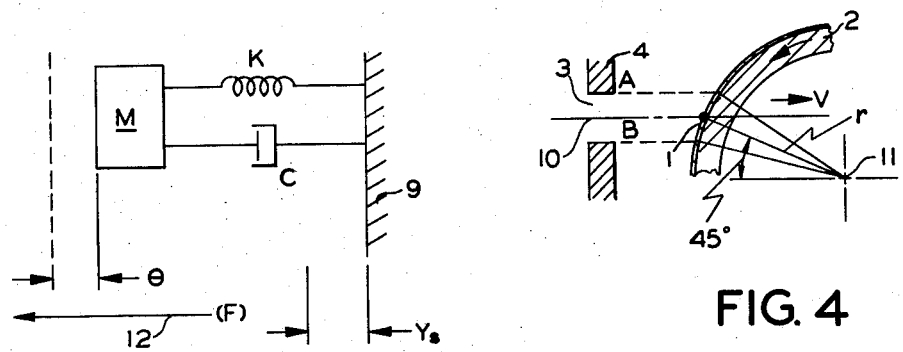
FIG. 3
FIG. 4
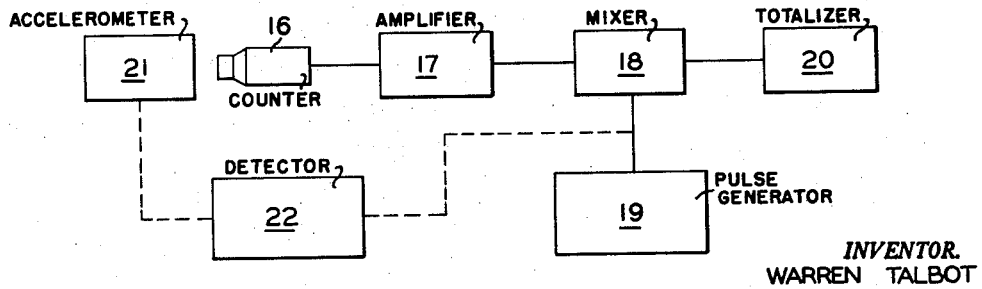
FIG. 5
INVENTOR.
WARREN TALBOT
BY R. E. Geangue
ATTORNEY

United States Patent Office 3,146,624
Patented Sept. 1, 1964

3,146,624
ACCELEROMETER
Warren Talbot, Woodland Hills, Calif., assignor to Guidance Technology, Inc., Santa Monica, Calif., a corporation of California
Filed Mar. 20, 1961, Ser. No. 96,739
14 Claims. (Cl. 73—517)

This invention relates to an accelerometer and more particularly to apparatus employing the detection of nuclear resonance to provide an electrical signal which is a function of the applied acceleration.

In certain devices for the guidance and control of missiles and spacecraft, it is necessary to continuously measure acceleration to extreme precision. Measured acceleration may be integrated with respect to time, once to obtain a measure of the vehicle's velocity and twice to obtain a measure of the vehicle's displacement. Ideally, the output from the accelerometer should be an electrical signal obtained directly without the necessity of an intermediate transducer. A displacement measuring technique of extreme accuracy, now generally referred to as the "Mössbauer effect," is described in a paper titled "Kernresonanzfloureszenz von Gammastrahlung in Ir$^{191}$" by Rudolf L. Mössbauer in Zeitschrift für Physik, Band 151, Heft 2, pages 124–143; 1958. By the present invention there is provided a novel structure by which the extremely high resolution of the Mössbauer effect may be efficiently applied to the measurement of acceleration. The detection of changes in nuclear resonance in response to changes in applied acceleration is employed in the present invention to provide an accelerometer capable of acceleration sensitivities on the order of $6 \times 10^{-4}$ g. with $6 \times 10^{-10}$ g. being the theoretical limit.

In a system that is arranged so that a radiation detector measures the amount of gamma energy passing through metallic foils, it has been found that the absorption due to nuclear resonance is dependent upon relative velocity between the absorber foil and the gamma radiation source. When this relative velocity is zero, the absorption of the gamma radiation is a maximum. For small relative velocities, the absorption decreases and eventually disappears. Extremely small relative velocities can be detected in this way.

There is provided by the present invention an accelerometer device which provides a means for measuring relative motion between a source of gamma radiation and an absorber foil which is free to move in response to applied accelerations.

It is therefore, a principle object of the invention to provide a novel accelerometer capable of measuring applied accelerations to extreme precision.

Another object of the invention is to provide accelerometer apparatus utilizing the measurement of changes in nuclear resonance resulting from applied acceleration.

Yet another object of the invention is to provide a novel and improved accelerometer which gives an electrical output directly proportional to the sign and magnitude of an applied acceleration.

Still another object of the invention is to provide novel and improved apparatus for controlling the transmission of gamma radiation in response to acceleration applied to the apparatus.

The invention will be understood more completely from the following detailed description, taken in conjunction with the accompanying drawings, in which:

FIGURE 1 is a diagrammatic representation of an accelerometer according to the invention.

FIGURE 2 is a graphic representation of the magnitude of nuclear absorption as a function of the relative velocity of the emitting nuclei.

FIGURE 3 is a diagram illustrating the basic components of the acceleration responsive structure.

FIGURE 4 diagrammatically illustrates the relationship of the collimater to the source.

FIGURE 5 is a block diagram of the electronic circuitry associated with the accelerometer.

There are approximately 1000 isotopes known that can be used to demonstrate the nuclear resonance characteristic. For example, the source may be osmium 191 which decays to iridium 191 with emission of 129 kev. gamma radiation and has a half-life of 16 days. Other radioisotopes which may be considered are iron-57, zinc-67, and tungsten-182. For purposes of describing the invention, it will be assumed that the radioistope cobalt-57 is employed. It should be understood, however, that a number of considerations such as the intensity of the source and half-life may dictate radioisotopes other than that selected in the exemplary case.

It is axiomatic to state that the accuracy that can be achieved in measuring a frequency increases with the number of oscillations involved. A typical frequency of a gamma ray vibration may be $10^{18}$ oscillations per second. This, then, may become the basis upon which extreme precision of measurement is made. The excited state of atomic nuclei, in which they emit gamma rays, is called the isomeric state and its duration is usually expressed in terms of a half-life—the time required for the intensity of the emitted radiation to decrease by half. Thus, a nucleus with a long half-life has an intrinsically better defined frequency than a nucleus of short-life. However, resonant excitation requires that the frequency of emitter and absorber be the same within their intrinsic accuracy. It follows, then, that the sharpness of resonance increases with the half-life of the excitation.

In a typical case of $10^{12}$ nuclear oscillations per second, the resonance effect disappears if the frequency of the emitting nucleus differs from that of the absorber by as little as one part in $10^{12}$. That is, the width of the resonance, or the line width, is one part in $10^{12}$.

Beginning with a radioactive source of the isotope cobalt-57, having a half-life of 280 days, the nuclei of the cobalt-57 decay into excited nuclei of iron-57. The iron nuclei radiate at a frequency of $3 \times 10^{18}$ oscillation per second, with a half-life of $10^{-7}$ second. Thus an iron-57 nucleus emits roughly $10^{12}$ waves.

The Mössbauer effect makes use of the fact that atoms are capable of absorbing gamma ray photons of discrete energy. These absorbed photons of gamma ray radiation will be subsequently reradiated in a random direction. The photon emitted from an atom of a particular material can be absorbed by an adjacent atom of the same material. In this way, one atom loses energy and the other gains energy. The distance between emitter and absorber atoms is not critical.

Since gamma radiation travels at the speed of light, increasing the energy of a photon cannot increase its velocity. Therefore the increase in energy is reflected as an increase in the frequency of the gamma radiation. Thus, there is a relationship between the energy and the frequency of an emitted gamma ray. It has been demonstrated, heretofore, that the frequency (and therefore the energy) of a gamma ray photon must be very closely controlled if it is to be absorbed by a particular atom. A very slight variation in frequency can prevent absorption of the gamma ray photon. A gamma ray photon emitted from one atom would have the required frequency and energy to be absorbed by an adjacent atom of the same material if it did not lose energy in recoil.

The frequency of the gamma radiation arriving at an absorber atom from an emitter atom is dependent upon the relative velocity between the two atoms. This is attributable to the well known Doppler effect in which there is an apparent frequency shift of wave energy from a moving source (or a moving detector).

When an atom emits a gamma ray photon, it is a recoil reaction. The energy (and frequency) of the emitted gamma ray is therefore dependent upon the amount of energy lost to the recoiling atom. Where the recoil energy is large, the gamma ray photon arrives at an adjacent atom with a shift in frequency (and energy) and therefore is not absorbed.

Various means are available to reduce or prevent the change in energy due to recoil, among them being the use of a centrifuge. Alternatively, the radioisotope may be cooled to cryogenic temperatures and thus anchor the atoms in the material lattice. When the gamma ray photons are emitted under these circumstances, the frequency and energy is such that they will be absorbed by atoms of the same material.

In the embodiment of the invention disclosed herein, it is preferred that the recoil of the atoms be overcome by properly anchoring the atoms in a suitable crystal lattice; under these circumstances the emitted gamma ray photons will be absorbed by adjacent atoms of the same material even at room temperatures.

The extreme sensitivity of the present invention arises from the fact that very slight relative velocities between emitter and absorber are sufficient to induce a Doppler shift in gamma ray frequency that will prevent absorption. For example, the degree of absorption measured at zero relative velocity can readily be lowered 40 percent at a relative velocity of only 0.6 mm./sec. with certain materials. This characteristic is graphically shown in FIGURE 2 in which the fraction of off resonance counting rate of emitted photons is plotted as a function of relative velocity (either side of zero) in mm./sec. Fraction of off resonance counting rate may be defined as the ratio of the counting rate at zero relative velocity divided by counting rate at any very large relative velocity (e.g., 10.0 mm./sec.). The plotted curve shows that at zero relative velocity between emitter and absorber the counting rates fall off to 65 percent of its value when the relative velocity is only 0.6 mm./sec. To establish the mathematical equation describing the performance of an accelerometer instrument, utilizing this change in counting rate, it should be noted that either the source or the absorber may be resiliently mounted with respect to the remainder of the instrument for imparting the relative motion necessary to provide an acceleration input to the system. The source velocity required to drop the absorption to one half of the peak value (at zero velocity) is shown in the following equation:

$$\frac{c}{2V} = 1.10 \times E_\gamma \times T^{1/2} \times 10^{12}$$

Where:

$c$ = velocity of light ($3 \times 10^{10}$ cm./sec.).
$V$ = source velocity required to drop absorption to ½ of peak value, cm./sec.
$E$ = energy of $\gamma$ rays, mev.
$T$ = half-life (of nuclear resonance), m$\mu$ sec.

Solving for V indicates that velocities of $5.97 \times 10^{-3}$ cm./sec. can be detected with iron-57. Velocities of $1.56 \times 10^{-5}$ cm./sec. can be detected with Zn-57. If this change in velocity takes place in one second ($1.56 \times 10^{-5}$ cm./sec.) the acceleration is $1.58 \times 10^{-8}$ g's.

Referring again to FIGURE 2, it will be noted that the change in counting rate is symmetrical either side of zero velocity. Inasmuch as the curve is symmetrical, ambiguity exists as to the direction of motion of the system if operation about zero velocity exists. As will be discussed hereinafter, means are provided to indicate direction sense, thus overcoming this ambiguity. Further examination of the curve of FIGURE 2 will indicate that the response is quite linear in the region of 0.2 mm./sec., indicated at 13, extending from 0.1 mm./sec. at 14 to 0.3 mm./sec. at 15. In the region between 14 and 15, a change of 0.1 mm./sec. results in a 12.5 percent change in absorption.

Looking now at FIGURE 1, there is shown, in diagrammatic form, a preferred embodiment of the apparatus of the invention suitable for measuring linear acceleration. A source of gamma rays, referred to hereinafter as emitter 1, is applied to the surface of rotating drum 2. The emitter may, for example, be cobalt-57 which decays to iron-57. This material has a high rate of gamma emission and a relatively long half-life (280 days). Emitted gamma ray photons pass through aperture 3 in collimating shield 4. Collimating shield 4 may be fabricated from lead or other high density material opaque to the transmission of gamma rays. The photons passing through aperture 3 impinge on absorber foil 5; reradiated gamma rays from foil 5 are detected by radiation detector 6, which may be a scintillation counter.

Rotation of drum 2 establishes a relative velocity of 0.2 mm./sec. between emitter 1 and absorber 5 (this optimum velocity is indicated at 13 in FIGURE 2). Aperture 3 collimates the emitted rays (photons) so that the absorbing foil 5 and detector 6 can be oriented such that it is exposed to the point on the drum having a advancing (or receding) velocity of 0.2 mm./sec. Motion of emitter 1 will be ultimately reflected as a change in relative velocity between emitter and absorber and this in turn will result in a change in absorption. An increase in relative velocity will decrease absorption; conversely, a decrease in relative velocity will increase absorption. In this way, ambiguity is overcome and the required direction sense will be obtainable at the output of the accelerometer. The means for rotating the drum 2 should be capable of holding the relative velocity constant to within 0.1 percent.

In the event that it is not required to obtain direction sense from the apparatus, or if direction ambiguity is overcome by external means, emitter 1 may be stationary, thus obviating drum 2.

Absorbing foil 5 is resiliently mounted thus allowing a differential motion, with respect to case or support 9, as a result of applied acceleration. For example, foil 5 may be mounted on springs 7 and 8, which are in turn mounted to case 9. That is, the rotating drum 2, collimating shield 4 and detector 6 would be rigidly mounted to case 9. This mechanical response to acceleration applied to the case 9 will be discussed in connection with FIGURE 3.

To keep the source concentration to a minimum, the distance between emitter 1 and detector 6 should be kept to a minimum; the separation of the elements, diagrammatically shown in FIGURE 1, has been exaggerated for clarity. Collimator 4 may be fabricated from a lead sheet having a thickness of 0.250 inch. A lead sheet of this thickness will attenuate the transmitted radiation by a factor of $10^{-5}$. The component geometry necessary to provide a relative velocity of 0.2 mm./sec. is shown in FIGURE 4. If the drum 2 has a radius $r$ of one-half inch and if the center line 10 of aperture 3 is 45° above the axis of rotation 11, the required relative velocity (V) of 0.2 mm./sec. will be provided when drum 2 has a rotational speed of 0.425 rev./min. The aperture distance from A to B (as shown in FIGURE 4) should be controlled so that the maximum variation in the relative velocity (V) across aperture 3 is +10 percent. In a practical embodiment, having dimensions as discussed in connection with the above example, the distance A—B will be 0.034 inch. Aperture 3 may be a rectangular slot with the A—B dimension being 0.034 inch and the long dimension being sufficient to extend across the face of the radiation detector 6. A convenient size for this long dimension is 1.18 inches (3 cm.).

The mechanics of the acceleration responsive elements are diagrammatically shown in FIGURE 3.

Typically, a linear accelerometer is a mass which is free to move in one degree of freedom against a restraining spring. If the free period of oscillation of the accelerometer is less than that of the acceleration, the deflection of the spring is proportional to acceleration. The force resulting from an acceleration (F) applied in the direction shown by arrow 12 is opposed by spring K, damper C and the inertia of movable element M. Spring K and damper C are rigidly mounted to case 9. In an undamped acclerometer, overshoot and extraneous vibrations mask the true indication. As is well known to those skilled in the art, various means may be employed to provide viscous damping; these means include liquid, air, or electromechanical damping devices. Optimum performance is considered to be obtained with less than (approximately 0.7) critical damping.

Because of the extreme sensitivity of the present invention, mechanical amplification of the deflection of the mass is not required. Also, since a large output is obtainable from a small deflection per unit acceleration, there is excellent response to rapid acceleration. The displacement of the movable element M is indicated by $\theta$ and the system displacement is indicated by $Y_s$. The relative velocity between the movable element M and the case 9 may be expressed by the following equation:

$$m_s a_s = k\theta + c\dot{\theta} + m_e \ddot{\theta}$$

Where:

$m_s$ = mass of system, gm.−sec.$^2$/cm.
$a_s$ = acceleration of system, cm./sec.$^2$
$k$ = spring rate, gm./cm.
$\theta$ = displacement, cm.
$\dot{\theta}$ = velocity, cm./sec.
$c$ = viscous restraint, gm./cm./sec.
$m_e$ = mass of movable element, M (in grams)/g (980 cm./sec.$^2$)
$\ddot{\theta}$ = acceleration of movable element, cm./sec.$^2$ in direction F.

In a practical embodiment of the device, an undamped natural frequency of two cycles per second may be employed. Assuming the damping ratio is critical (0.7) the time required for the movable element M to reach maximum velocity, after application of a step input, is 0.177 seconds. Since a relative velocity of 0.1 mm./sec. may be detected, the minimum detectable acceleration is $6.15 \times 10^{-4}$ g's. Other isotopes and refined detecting circuits can readily extend this sensitivity, the theoretical limit being $10^{-10}$ g's.

The electrical output from the radiation detector may be utilized by any one of several techniques well known to those skilled in the art. For example, there is shown in FIGURE 5, ancillary electronic circuitry which will integrate or totalize changes of acceleration.

At rest, positive counts from scintillation counter 16 are amplified by amplifier 17 and supplied to one input of mixer 18. A negative pulse generator 19 continuously supplies negative counts to the alternate input of mixer 18. The pulse rate output from negative pulse generator 19 is adjusted to provide a zero output to digital pulse totalizer 20 when the system is at rest. Any acceleration applied to the accelerometer 21 will alter the counting rate signal received from amplifier 17. The direction of change (increase or decrease) in the counting rate will indicate the direction of the applied acceleration. The magnitude of the change is proportional to the magnitude of the applied acceleration. The change in counting rate is compared to the input from the negative pulse generator 19 into mixer 18. Only changes in counting rate can alter the output to the digital pulse totalizer 20. The mixer operates on a statistical basis with the pulses to one input being subtracted from the pulses to the other input; a net difference will appear at the output. Structurally, mixer 18 may be a bi-directional electronic counter. Other means for negating the fixed counting rate at zero velocity will suggest themselves to those skilled in the art. The output of the totalizer 20 (which may be any suitable electronic accumulator) will remain fixed as long as the applied acceleration is maintained constant. It will indicate the magnitude and direction of the applied acceleration. Now if the applied acceleration is changed, there will be a reflected change in the output of the totalizer 20.

As stated previously, the time for the movable element to reach maximum velocity will be 0.177 seconds. From the discussion of the Mössbauer effect in an earlier section of this specification, it was shown that this maximum velocity will result in a 12.5 percent change in absorption. The apparatus of the exemplary embodiment will detect a change of one tenth of the total expected change, or 1.25 percent. The time constant of the indicating circuit may be adjusted to provide four readings during this rise to maximum velocity. The time constant of the counting circuit would therefore become 0.040 second.

Various modifications of the apparatus discussed above will become apparent to those skilled in the art. For example, the negative pulse generator 19 may be replaced by a second radiation detector 22 (as shown in FIGURES 1 and 5), which generates counting pulses in response to radiation from emitter 1. These pulses are calibration or reference pulses and are subtracted from the pulses from detector 6. The second radiation detector 22 comprises detector 6′ and collimating shield 4′ which structurally resemble detector 6 and shield 4, respectively. Inasmuch as there is no absorber foil between detector 22 and emitter 1, changes in velocity or acceleration will not alter the counting rate output from detector 22. This, then, becomes an alternative to the negative pulse generator and will permit only the differential pulse output, arising from changes in absorption, to be indicated by the digital pulse totalizer 20.

As will be apparent to those skilled in the art, the apparatus of the linear accelerometer embodiment described may be modified to measure angular acceleration. For example, a symmetrical mass in the form of a disc may be mounted so that it may deflect about its center of gravity. This angular deflection, restrained by a spiral spring, may be imparted to the absorber foil of the apparatus. The angular deflection will be proportional to angular acceleration and may be kept small by choice of the spring stiffness and the moment of inertia of the mass. As with the linear accelerometer, response to rapidly imposed accelerations can be secured only by decreasing the period of oscillation thus decreasing the sensitivity.

While there have been shown and described the fundamental and novel features of the invention as applied to a preferred embodiment, it will be understood that various omissions, substitutions, and changes in the form and details of the device illustrated and in its operation may be made by those skilled in the art, without departing from the spirit of the invention; therefore it is intended that the invention be limited only as indicated by the scope of the following claims.

What is claimed is:

1. An accelerometer comprising, a support member, a source of gamma ray energy, means for suppressing the recoil of the atomic nuclei emitting said energy, said source being mounted on said support member, an absorber receiving said gamma ray energy and having atomic nuclei which will exhibit resonance absorption when receiving photons from said source under conditions of zero relative velocity between said source and said absorber, said absorber being resiliently mounted on said support member so that it will be displaced in response to the force of acceleration applied to said support member, and means for detecting photons reradiated from said absorber to sense acceleration.

2. An accelerometer as defined in claim 1 wherein said source comprises a radioisotope and said means for suppressing recoil comprises a crystal lattice.

3. An accelerometer as defined in claim 1 including a collimator comprising a member opaque to gamma energy and having an aperture through which a portion of the radiated energy may pass.

4. An accelerometer as defined in claim 1 including a rotating member, rotatably mounted on said support member and carrying said source on the surface thereof.

5. An accelerometer as defined in claim 4 wherein said detecting means continually receives a counting rate proportional to the speed of rotation of said rotation member, and means for negating said counts in the absence of applied acceleration.

6. In an accelerometer, the combination of: a recoilless source of gamma ray photons, means for collimating said photons into a beam, absorber means composed of the same material as said source and located in the path of said beam and movable with respect to said source and said collimating means in response to the force of acceleration, and radiation detector means responsive to photons reradiated from said absorber means to sense displacement of said absorber means.

7. The combination defined in claim 6 with: rotating means for imparting a fixed velocity to said source, and means coupled to said detector means for negating the sensed displacement in the absence of externally applied acceleration.

8. An accelerometer comprising, a support member, a recoilless source of gamma ray energy, said source being mounted on said support member, an absorber foil receiving said gamma ray energy and having atomic nuclei which will exhibit resonance absorption when receiving photons from said source under conditions of zero relative velocity between said source and said absorber foil, said absorber foil being resiliently mounted on said support member so that it will be relatively displaced in response to the force of acceleration applied to said support member, and a scintillation counter for detecting photons reradiated from said absorber foil to sense acceleration.

9. An accelerometer comprising, a radioisotope for emitting gamma ray photons, collimator means for collimating said photons into a beam, absorber means located in the path of said beam, said absorber means being capable of mximum absorption of said photons under conditions of zero relative velocity between said radioisotope and said absorber means, said absorber means being responsive to changes of said relative velocity so as to decrease the absorption of said photons, resilient means mounting said absorber means so that an applied acceleration will result in a relative displacement between said absorber means and said radioisotope, and detector means responsive to reradiation of said absorber means to sense the applied acceleration.

10. An accelerometer comprising, a source of gamma rays, absorber means having atomic nuclei which are responsive to the gamma rays emitted from said source to exhibit nuclear resonance under conditions of zero relative velocity between said source and said absorber means, detector means responsive to nuclear resonance of said absorber means, said absorber means being resiliently mounted with respect to said source whereby an applied acceleration will result in different relative velocities of said source and said absorber means thereby causing said detector means to sense a change in nuclear resonance.

11. An accelerometer as defined in claim 10 wherein said source and said absorber means are each fabricated from the same radioisotope.

12. An accelerometer as defined in claim 10 wherein said detector means comprises a scintillation counter responsive to changes in reradiation of said absorber means resulting from corresponding changes in nuclear resonance.

13. An accelerometer as defined in claim 10 including means for continuously imparting a fixed relative velocity between said source and said absorber means thus providing direction sense to the detected output from said detector means.

14. An accelerometer as defined in claim 10 wherein said detecting means continually receives a signal proportional to the fixed relative velocity of said source, and means for negating said signal in the absence of applied acceleration.

References Cited in the file of this patent

An article from "Physical Review Letters," Dec. 15, 1959, pages 554–556, entitled "Resonant Absorption of the 14.4-kev. V Ray," by Pound et al.

An article from "Physical Review Letters," Dec. 15, 1959, pages 556–7, entitled "Recoilless Resonance Absorption of Gamma Rays in Fe 57," by Schiffer et. al.

An article from "Physical Review Letters," Apr. 1, 1960, pages 337–341, entitled "Apparent Weight of Photons," by Pound et al.